UNITED STATES PATENT OFFICE.

JEHU BRAINERD AND W. H. BURRIDGE, OF CLEVELAND, OHIO.

IMPROVEMENT IN TANNING.

Specification forming part of Letters Patent No. 25,241, dated August 20, 1859.

*To all whom it may concern:*

Be it known that we, J. BRAINERD and W. H. BURRIDGE, of Cleveland, in the county of Cuyahoga and State of Ohio, have invented new and useful Improvements in the Art of Tanning; and we do hereby declare that the following is a full and complete description of the process and the materials used therein.

The nature of our invention consists in the conversion of skins and hides into leather by immersing the same in a tan-liquor prepared by the digestion of the hereinafter-named plants in water, with or without the addition of other substances containing tannin, the said hides or skins having been previously prepared to receive the tan by treatment in a preparation of liquor, as set forth.

The skins or hides are unhaired in any of the usually-practiced modes, freed from lime, and bated. They are then prepared to receive the tan by being handled in a preparation-liquor for one or more days, according to the thickness of the hides, this step in the process having been secured to us by Letters Patent which bear date of June 7, 1859. In making this preparation-liquor we prefer to use strong solutions of alum and common salt in equal quantities, with one-half pound chloride of zinc for every one hundred gallons. From five to ten pounds of gum-aloes may also be added, previously dissolved. Other basic or haloid salts may be used. After treatment in the preparation-liquor, as above, and thorough draining, the skins or hides are ready for the tan-liquor.

We prepare the tan-liquor in the following-described manner: Take a suitable vessel, one that has a close cover is preferred, and so constructed as to be conveniently heated, either by the direct application of fire to the copper bottom, (iron should never be used,) or by a steam-pipe introduced into the vessel, and fill this with *Marrubium vulgare*, (hoarhound,) or with *Leonurus cardiaca*, (motherwort,) or with a mixture of these. Secure the herbs well in place and add water in quantity sufficient to cover them. Soft water is preferred. Heat should now be applied by steam or otherwise until the water has become boiling hot, the vessel being at the same time kept closely covered in order to prevent the escape of the volatile matter of the herb. The decoction may now be drawn off into a tub or vat to cool.

The vessel containing the herb should be again immediately filled with water and heat applied as before; or it may remain till cool. The herbs may then be removed and placed upon an inclined table, so as to save the drippings. The liquor obtained by this second heating may be used instead of water for a fresh supply of herbs, and if the quantity is not sufficient to cover the herbs fresh water may be used to supply the deficiency. The vessel should be again closely covered and heat applied as before, and by repeating this process a sufficient quantity of tan-liquor is obtained to fill the vat. It is important that the vessel in which the decoction is prepared should be kept closely covered or supplied with a condensing apparatus in order to save the volatile products of the plants used, for this family of plants is rich in volatile and extractive matter, which, by combining with the animal fiber in the process of tanning, or by becoming incorporated therewith, gives to the leather a peculiar softness, pliability, and aromatic odor, which for many purposes much enhances its value, and especially so for book-binding and other similar purposes; but we do not claim broadly the use of plants belonging to this genera (*Labiatae*) further than what is herein set forth and claimed by us. We wish, however, to be distinctly understood that in the preparation of tan-liquor from the plants named we intend to preserve all the essential and extractive matters of the plants for the objects named; and to this end they should be gathered when in full vigor and dried, if possible, in the shade. Grinding of the dry herb will facilitate the extraction of the valuable properties, and the ground herb may be used in mass, as hereinafter specified. In warm weather, in order to prevent fermentation and the consequent conversion of the soluble tannin into acetic acid, we add to the tan-liquor from ten to twenty pounds of common salt to every one hundred gallons of the liquor. The tan-liquor thus prepared, when cold or reduced below a temperature of 100° Fahrenheit, is ready for the prepared skins designed for soft leather. Calf-skins should be handled in this tan-liquor for three days, and, after being thoroughly drained, returned again for one day to the preparation-liquor. Thick skins should remain in the tan-liquor for six or seven days before being returned to the preparation-liquor.

While skins or hides are being treated for the first time in tan-liquor, as above, a second vat of tan-liquor should be prepared as before, to which may be added six pounds of catechu for every one hundred gallons of the tan-liquor. The catechu should be dissolved in hot water and thoroughly mixed with the liquor before adding the hides or skins. A strong decoction of bark may be used instead of catechu. The skins or hides that have been handled in the tan-liquor once, as above described, should now be handled in this after coming the second time from the preparation-liquor. Ordinarily it will require three or four days handling in this to complete the tanning of calf-skins; but the time will vary according to the thickness of the skins and strength of the tan-liquor, which should be kept renewed. An increase of temperature to any point below 100° Fahrenheit will hasten the process; but the temperature should never be elevated above 100°, as it would tend to injure the leather.

In tanning sole-leather, catechu should be added to the first portion of tan-liquor in which the hides are handled, and such will need at least three freshly-prepared or freshly-recruited tan-liquors, and from twenty to forty days handling. An occasional immersion for a day in the preparation-liquor will facilitate the process; but in all cases the hides or skins should be thoroughly drained before entering the tan-liquor. It is not, however, essential that skins or hides be immersed the second time in the preparation-liquor after they have been in the tan, provided they have been thoroughly saturated with the preparation during their first treatment therein.

In the preparation of the tan-liquor the tanning principle and other valuable ingredients may be extracted by the use of cold water; or the herbs may be broken or ground and stratified with the skins, as has been common in the use of bark. An infusion or decoction of bark may be used in mixture with the hoarhound or motherwort or these may be used conjointly. We also contemplate making use of other species of the *Labiatæ* than those named in the preparation of tan-liquor. Neither do we in the use of catechu intend to confine ourselves to the exact proportions herein named.

When skins or hides have become thoroughly tanned by our process they may be finished in the usual manner.

What we claim as our invention and discovery, and for which we desire Letters Patent of the United States, is—

The improvement in tanning herein set forth, consisting in the immersion of the skins and hides in a tan-liquor made from the digestion of the before-mentioned plants, and the accompanying treatment of the skins and hides by their immersion in the preparing-liquid, the whole process being conducted in the manner set forth, whereby the valuable properties of the plants may be preserved for use; and this we claim, whether the above-described tan-liquor be used separately or in connection with other substances containing tannin.

J. BRAINERD.
W. H. BURRIDGE.

Witnesses to the signature of J. Brainerd:
 EDM. F. BROWN,
 DANIEL BREED.

Witnesses to the signature of W. H. Burridge:
 S. MATHER,
 H. VOTH.